(No Model.) 3 Sheets—Sheet 1.
W. F. PEEL.
MEANS FOR ATTACHING FIRE ARMS TO CAVALRY HARNESS.
No. 464,890. Patented Dec. 8, 1891.
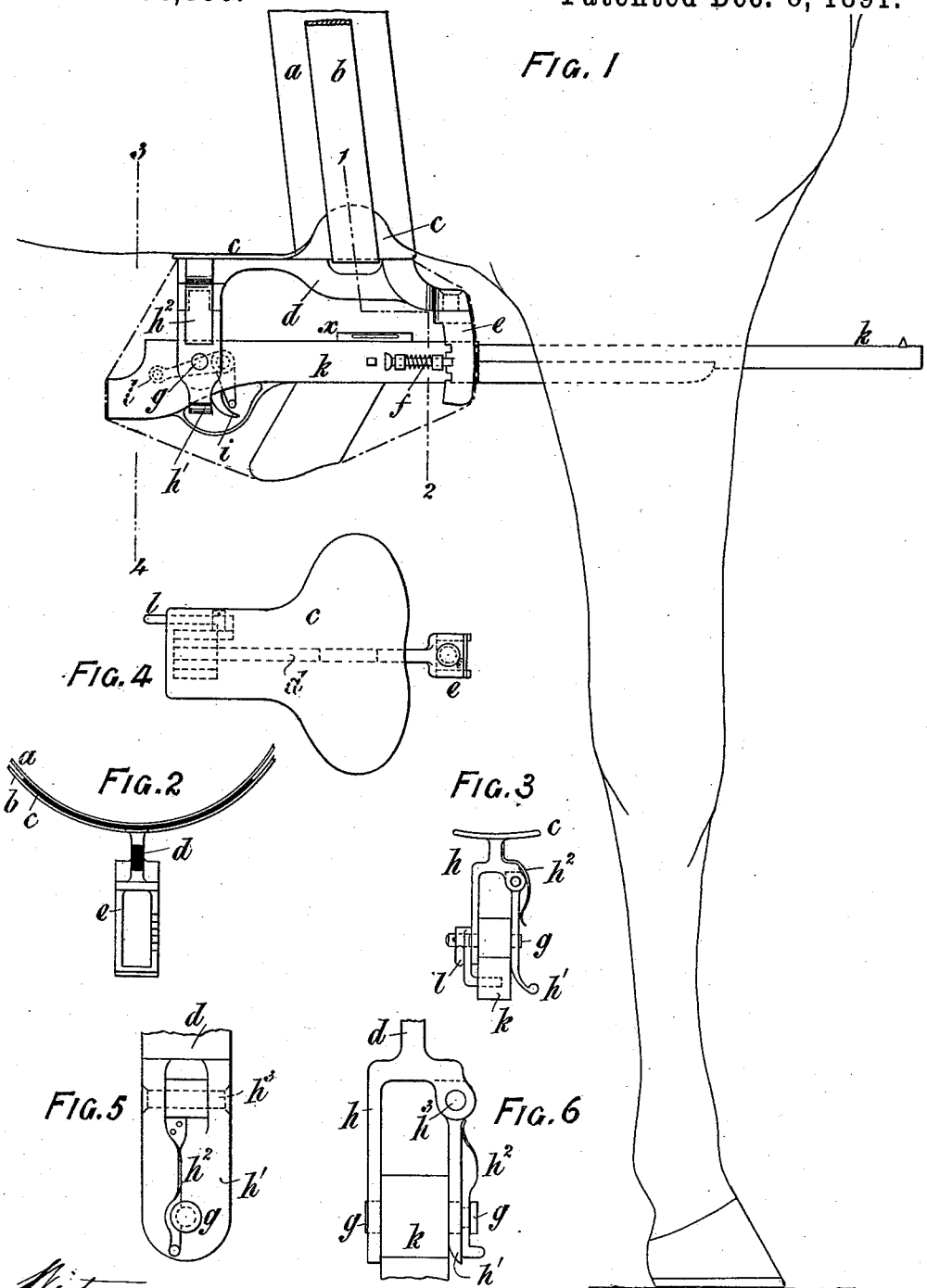

(No Model.) 3 Sheets—Sheet 2.
W. F. PEEL.
MEANS FOR ATTACHING FIRE ARMS TO CAVALRY HARNESS.
No. 464,890. Patented Dec. 8, 1891.
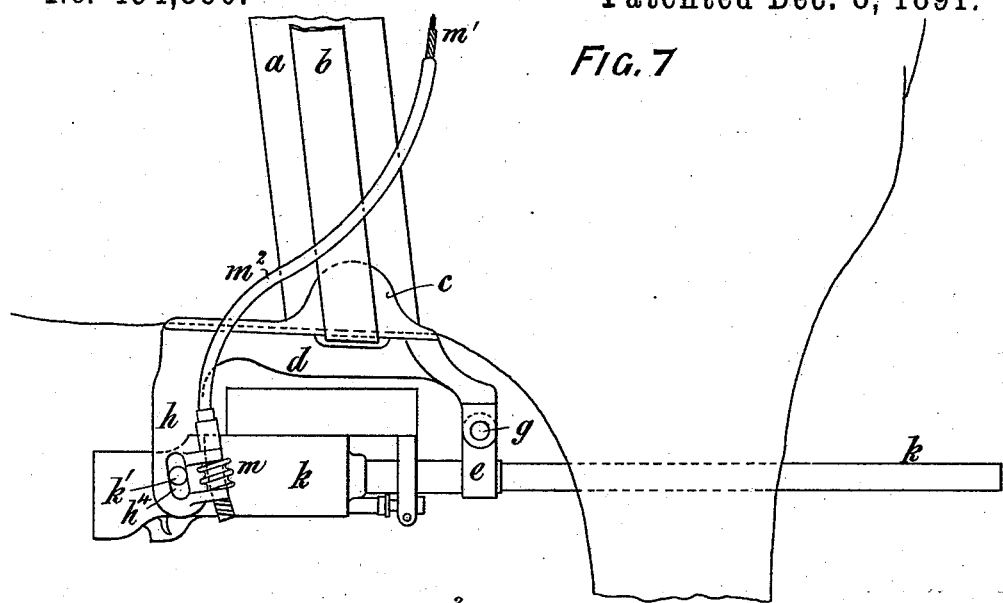
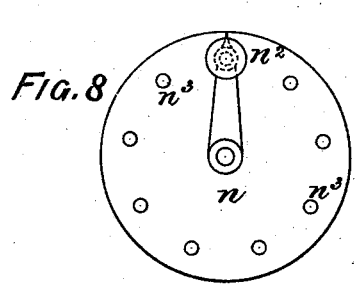
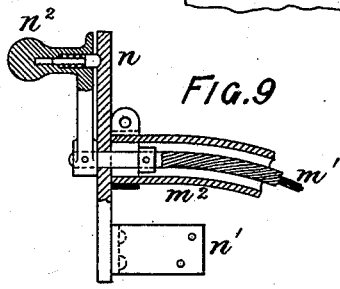
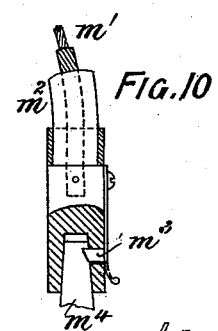
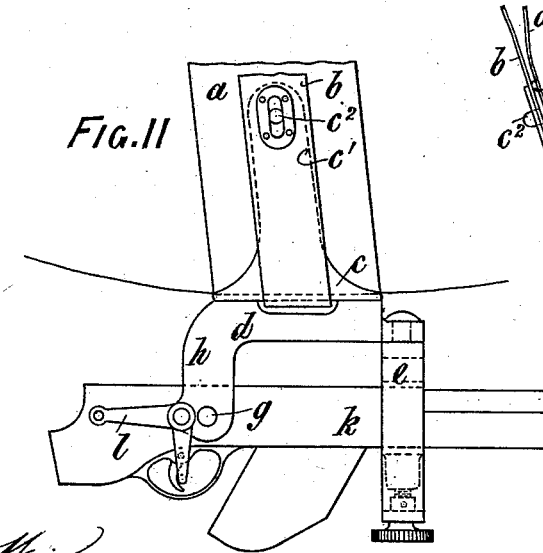
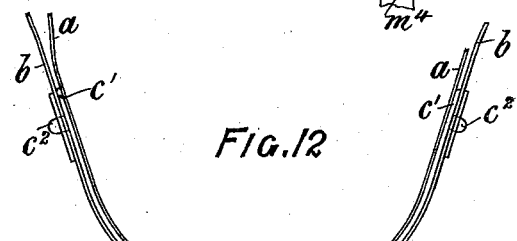

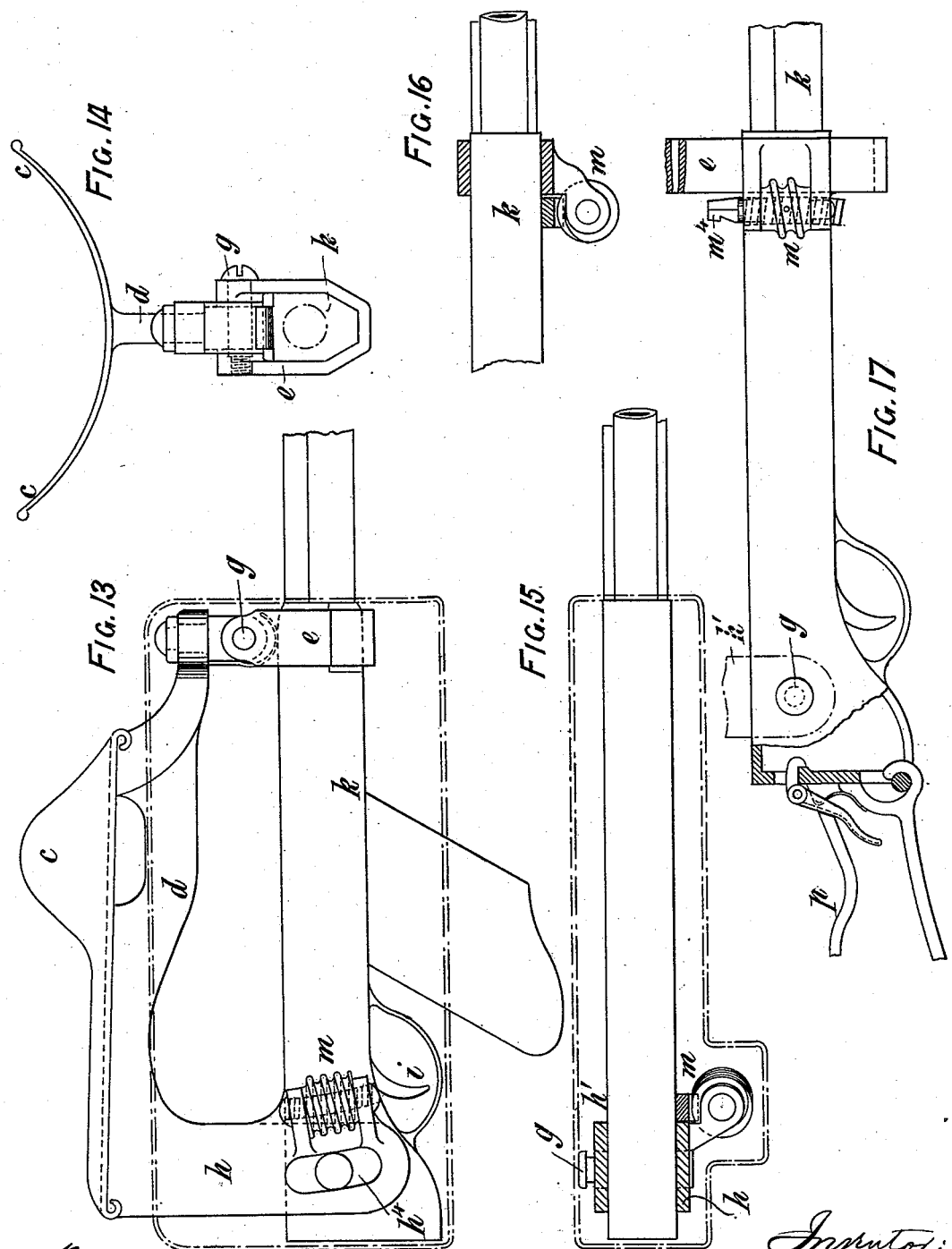
(No Model.) 3 Sheets—Sheet 3.
W. F. PEEL.
MEANS FOR ATTACHING FIRE ARMS TO CAVALRY HARNESS.
No. 464,890. Patented Dec. 8, 1891.

UNITED STATES PATENT OFFICE.

WILLIAM F. PEEL, OF LONDON, ENGLAND.

MEANS FOR ATTACHING FIRE-ARMS TO CAVALRY HARNESS.

SPECIFICATION forming part of Letters Patent No. 464,890, dated December 8, 1891.

Application filed August 12, 1891. Serial No. 402,459. (No model.) Patented in England March 6, 1891, No. 4,071.

*To all whom it may concern:*

Be it known that I, WILLIAM FREDERICK PEEL, captain in Her Majesty's army, a subject of the Queen of Great Britain, residing at the Bachelors' Club, Piccadilly, London, England, have invented certain new and useful Improvements in Attaching Fire-Arms to Cavalry Harness and in Manipulating and Firing the Same, (for which I have obtained a patent in Great Britain, No. 4,071, dated March 6, 1891,) of which the following is a specification.

The object of my invention is to attach rifles or other fire-arms to the harness of cavalry horses and other animals in such a manner that they may be fired at the will of the rider while so attached.

In carrying out my invention I provide and fit to the under side of the girth or belly-band or any equivalent portion of the harness a hook, clip, strap, or other suitable appliance for attaching, sustaining, and adjusting the fire-arm in a central position longitudinally under the body of the horse or other animal, the muzzle end of the fire-arm projecting forward in the direction of and preferably beyond the chest of the animal, the barrel passing between its fore legs. Suitable attachments are also fitted to the harness to support and adjust the fire-arm. The rider is provided with means and appliances for discharging the fire-arm while the latter remains in the position above described. These means may consist of mechanical, electrical, pneumatic, or other appliances. In working by means of electricity a battery, accumulator, or dynamo may be fitted to the saddle, and electro-magnets or other appliances may be fitted so as to operate the trigger of the fire-arm, the connection being effected by means of one or more wire or wires so arranged that by touching a button the electric force causes the piece to fire, the operation being repeated, as required, until the fire-arm has discharged its ammunition. In an analogous manner compressed air may be utilized either with a reservoir of air under pressure communicating by means of a tube with suitable mechanism for operating the trigger, or the air may be compressed by hand and caused to operate the trigger mechanism in a similar manner; or the trigger may be actuated by direct mechanical means consisting of a cord or other connection leading to the mechanism. The harness is also arranged so as to prevent the animal's head being lowered when firing by means of a bearing-rein or other attachment to the bit or bridle.

In order that my said invention may be particularly described and ascertained, reference is hereby made to the accompanying drawings, in which similar letters of reference indicate corresponding parts.

Figure 1 is an elevation showing the position of the fire-arm attached to a horse. Fig. 2 is a section on the line 1 2 of Fig. 1, looking forward. Fig. 3 is a section on the line 3 4 of Fig. 1, also looking forward. Fig. 4 is a plan view of the belly-plate. Fig. 5 is a side view, and Fig. 6 a transverse view, showing another method of releasing the fire-arm. Fig. 7 shows a method of fitting the pivot in a more forward position and regulating its line of fire by means of a worm and toothed rack, in combination with a flexible shaft. Figs. 8, 9, and 10 are detail views showing a method of attaching the flexible shaft to the worm above mentioned and to the saddle. Figs. 11 and 12 illustrate another method of mounting and elevating the fire-arm. Fig. 13 is an elevation, and Fig. 14 a section, showing a magazine fire-arm mounted and regulated by a worm and toothed rack, and Fig. 15 is a plan of the same. Fig. 16 is a part plan, and Fig. 17 an elevation, illustrating another method of mounting the fire-arm and attaching a movable stock or butt.

Referring to Figs. 1 to 4, $a$ is a portion of the girth or belly-band of a horse. $b$ is a surcingle outside the girth $a$. $c$ is a plate securely held in position by the surcingle $b$, which passes under the plate $c$. $d$ is a vertical plate formed in one with or attached to the plate $c$. The forward end of the plate $d$ carries a rectangular frame $e$, one side of which is provided with notches for receiving a spring-bolt $f$. The back ends of the plates $c$ and $d$ support a frame $h$, to which the breech of the gun $k$ is pivoted at $g$. $x$ is a spirit-level. The muzzle of the gun $k$ can be raised, lowered, or leveled, and secured in either of these positions by means of the bolt $f$, engaging in either of the notches in the side of the frame $e$.

The action and other parts of the gun liable to be injured by dust and dirt may be covered in with leather or other suitable material, as shown by dotted lines in Figs. 1, 13, and 14.

$l$ is a bell-crank lever pivoted to the frame $h$ for actuating the trigger $i$. The long arm of the lever $l$ is fitted with a cord or line whereby the piece may be fired by the rider at any time.

One method of detaching the gun is shown in Fig. 3. The hinged side $h'$ (forming one side of the frame $h$) is held in its place by a spring $h^2$, one of the pivots or trunnions $g$ passing through the side $h'$. By lifting this hinged side $h'$ the gun is freed and may be withdrawn from the supports.

Figs. 5 and 6 show a modified form of the above arrangement in which the end of the pivot $g$ has a groove, into which the gab of the spring-catch $h^2$ engages. By withdrawing this spring-catch from the pivot $g$ the hinged side of the frame $h$ is freed and may be lifted previously to removing the gun, as before described.

Referring to Figs. 7 to 10, the gun $k$ is shown pivoted to the frame $e$ at $g$. The breech end of the gun is fitted with a stud $k'$ on each side. These studs slide in slots $h^4$ in the frame $h$. $m$ is a worm fitted in bearings carried by the frame $h$. A rack to correspond with the worm $m$ is formed upon the gun, whereby the gun can be adjusted. $m'$ is a flexible shaft inclosed in a flexible tubular case, the upper end of which is carried to the saddle.

Fig. 8 is a face view, and Fig. 9 a section, showing the method of actuating the upper end of the flexible shaft and mounting the same upon the saddle. $n$ is a locking-plate attached to the saddle by the provision $n'$. $n^2$ is a handle fitted with a spring-plug for engaging in one of the holes or countersinks $n^3$. The crank is fitted to the flexible shaft $m'$, whereby the latter and also the worm $m$, Fig. 7, are turned, as required.

Fig. 10 is a section showing one method of attaching the end of the flexible shaft $m'$ to the axle $m^4$ of the worm $m$. $m^3$ is a spring-catch for securing the shaft to the axle $m^4$ of the worm $m$.

Fig. 11 is an elevation, and Fig. 12 a front view, showing more particularly a modified form of the plate $c$. In this case the plate $c$ is prolonged upward by two flexible wing-pieces $c'$ and $c'$, the extremities of which pieces are provided with studs $c^2 c^2$, which pass through holes in the surcingle and so secure the former to the latter. The regulation in this case is effected by the milled headed screw $o$ raising or lowering the frame-piece $o'$, in which the gun rests and which is carried by the frame $e$, the gun being pivoted, as in the former case, at $g$ in the frame $h$.

Referring to Figs. 13, 14, and 15, a gun is shown of a modified arrangement mounted in an analogous manner to that shown in Fig. 7, but with the flexible shaft dispensed with. The worm-gear $m$ is shown in plan in Fig. 15.

In Figs. 16 and 17 the gun is shown pivoted at $g$ to the frame $h$ and having the worm and rack $m$ arranged at the fore end, whereby the muzzle can be raised and lowered, as required, a method of attaching a stock $p$ being also shown in Fig. 17, which will be understood from the drawings.

I claim—

1. The combination, with cavalry harness provided centrally at its lower portion with a fire-arm support adapted to lie centrally under the body of the animal, of a fire-arm suspended longitudinally by said support with the muzzle pointing forward, and firing devices connected with the breech portion of the fire-arm and arranged to be operated at the will of the rider for discharging the fire-arm, substantially as described.

2. The combination, with the harness-girth, of a vertically-arranged fire-arm-supporting plate suspended centrally from the girth at the lower portion thereof, a fire-arm having its breech portion suspended from the supporting-plate, a fire-arm-adjusting frame connected with the plate and provided with means for raising, lowering, and leveling the fire-arm, and firing devices connected with the breech portion of the fire-arm and arranged to be operated at the will of the rider for discharging the fire-arm, substantially as described.

Dated this 30th day of July, 1891.

WILLIAM F. PEEL.

Witnesses.
GEORGE F. DOWNING,
8 *Quality Court, London, W. C.*
JOSEPH LAKE,
17 *Gracechurch Street, London, E. C.*